(12) United States Patent
Pytlarz et al.

(10) Patent No.: US 12,293,498 B2
(45) Date of Patent: May 6, 2025

(54) LUMINANCE ADJUSTMENT BASED ON VIEWER ADAPTATION STATE

(71) Applicant: Dolby Laboratories Licensing Corporation, San Francisco, CA (US)

(72) Inventors: Jaclyn A. Pytlarz, San Jose, CA (US); Jake W. Zuena, San Jose, CA (US); Per Jonas A. Klittmark, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 54 days.

(21) Appl. No.: 18/281,295

(22) PCT Filed: Mar. 2, 2022

(86) PCT No.: PCT/US2022/018547
§ 371 (c)(1),
(2) Date: Sep. 10, 2023

(87) PCT Pub. No.: WO2022/203826
PCT Pub. Date: Sep. 29, 2022

(65) Prior Publication Data
US 2024/0169504 A1 May 23, 2024

Related U.S. Application Data

(60) Provisional application No. 63/164,165, filed on Sep. 10, 2023.

(30) Foreign Application Priority Data

Mar. 22, 2021 (EP) ..................... 21163880

(51) Int. Cl.
*G06T 5/92* (2024.01)
*H04N 21/442* (2011.01)
*H04N 21/485* (2011.01)

(52) U.S. Cl.
CPC ......... *G06T 5/92* (2024.01); *H04N 21/44218* (2013.01); *H04N 21/4854* (2013.01); *G06T 2207/10016* (2013.01)

(58) Field of Classification Search
CPC ............ G06T 5/92; G06T 2207/10016; H04N 21/44218; H04N 21/4854; H04N 1/407;
(Continued)

(56) References Cited

U.S. PATENT DOCUMENTS 10,319,311 B2  6/2019  Du
10,514,756 B2  12/2019  Mere
(Continued)

FOREIGN PATENT DOCUMENTS

WO  20120125802 A1  9/2012
WO  20180119161 A1  6/2018

OTHER PUBLICATIONS

Andrew B. Watson et al., A unified formula for light-adapted pupil size, Journal of Vision, Sep. 25, 2012, 16 pages, vol. 12, No. 10, http://dx.doi.org/10.1167/12.10.12.
(Continued)

*Primary Examiner* — John W Miller
*Assistant Examiner* — Omer Khalid

(57) ABSTRACT

A video delivery system for luminance adjustment based upon a viewer adaptation state comprises a processor configured to: receive a source image including a current image frame including metadata corresponding to a mean luminance value of the current image frame, and the source image including an upcoming image frame including metadata corresponding to a mean luminance value of the upcoming image frame. The processor is configured to determine an ambient luminance value based on an ambient luminance, determine an incident luminance value based on the ambient luminance value and the mean luminance value,
(Continued)

determine a difference between a current pupil size and a target pupil size, and generate an output image by modifying the source image based on a luminance adjustment factor, the luminance adjustment factor being a function of the difference between the current pupil size and the target pupil size.

17 Claims, 6 Drawing Sheets

(58) Field of Classification Search
CPC .. H04N 1/6086; H04N 1/6088; H04N 1/6027; H04N 19/98
USPC .......................................................... 348/687
See application file for complete search history.

(56) References Cited

U.S. PATENT DOCUMENTS

| | | | |
|---|---|---|---|
| 10,600,166 | B2 | 3/2020 | Pytlarz |
| 10,783,835 | B2 | 9/2020 | Luna |
| 10,803,812 | B2 | 10/2020 | Hong |
| 10,810,773 | B2 | 10/2020 | Yildiz |
| 2012/0182278 | A1* | 7/2012 | Ballestad .............. G01J 1/4204 345/207 |
| 2017/0277258 | A1 | 9/2017 | Ma |
| 2019/0265785 | A1 | 8/2019 | Ho |
| 2019/0290118 | A1 | 9/2019 | Jha |
| 2019/0362476 | A1* | 11/2019 | Pytlarz ..................... G06T 5/92 |
| 2019/0384063 | A1* | 12/2019 | Oliver ................ G02B 27/0172 |
| 2020/0013151 | A1* | 1/2020 | Atkins ...................... G06T 5/92 |
| 2020/0036934 | A1 | 1/2020 | Yang |
| 2020/0098335 | A1 | 3/2020 | Chen |
| 2020/0105226 | A1 | 4/2020 | Greenebaum |
| 2020/0129063 | A1* | 4/2020 | McGrath ................... A61B 3/00 |
| 2020/0275050 | A1* | 8/2020 | Pytlarz ................. H04N 19/117 |

OTHER PUBLICATIONS

Bastian Pfleging et al., A Model Relating Pupil Diameter to Mental Workload and Lighting Conditions, 2016, pp. 5776-5788, Association for Computing Machinery, New York, NY, USA.

K.C. Noland and M. Pindoria, A Brightness Measure for High Dynamic Range Television, Apr. 2018, Mar. 23, 2018, pp. 55-61, vol. 127, Issue 3, SMPTE Motion Imaging Journal.

Katy C. Noland et al., Modeling Brightness Perception for High Dynamic Range Television, 2017, pp. 1-6, Ninth International Conference on Quality of Multimedia Experience (QoMEX), Erfurt, Germany.

P. Adhikari et al., The Post-Illumination Pupil Response, Jun. 2015, pp. 3838-3849, vol. 56, No. 6, ). Invest Ophthalmol Vis Sci.

P. Irawan et al. , Perceptually Based Tone Mapping of High Dynamic Range Image Streams, 2005, , 12 pages, Eurographics Symposium on Rendering.

S. Ploumis et al., Brightness in Cinema: When is it Too Bright? Oct. 2019, 18 pages, SMPTE, Los Angeles, CA, USA.

Yoshitaka Ikeda, Subjective Evaluations on Perceptual Image Brightness in High Dynamic Range Television, 2019, pp. 308-1-308-6, &T Int'l. Symp. on Electronic Imaging: Image Quality and System Performance XVI, Published Online.

* cited by examiner

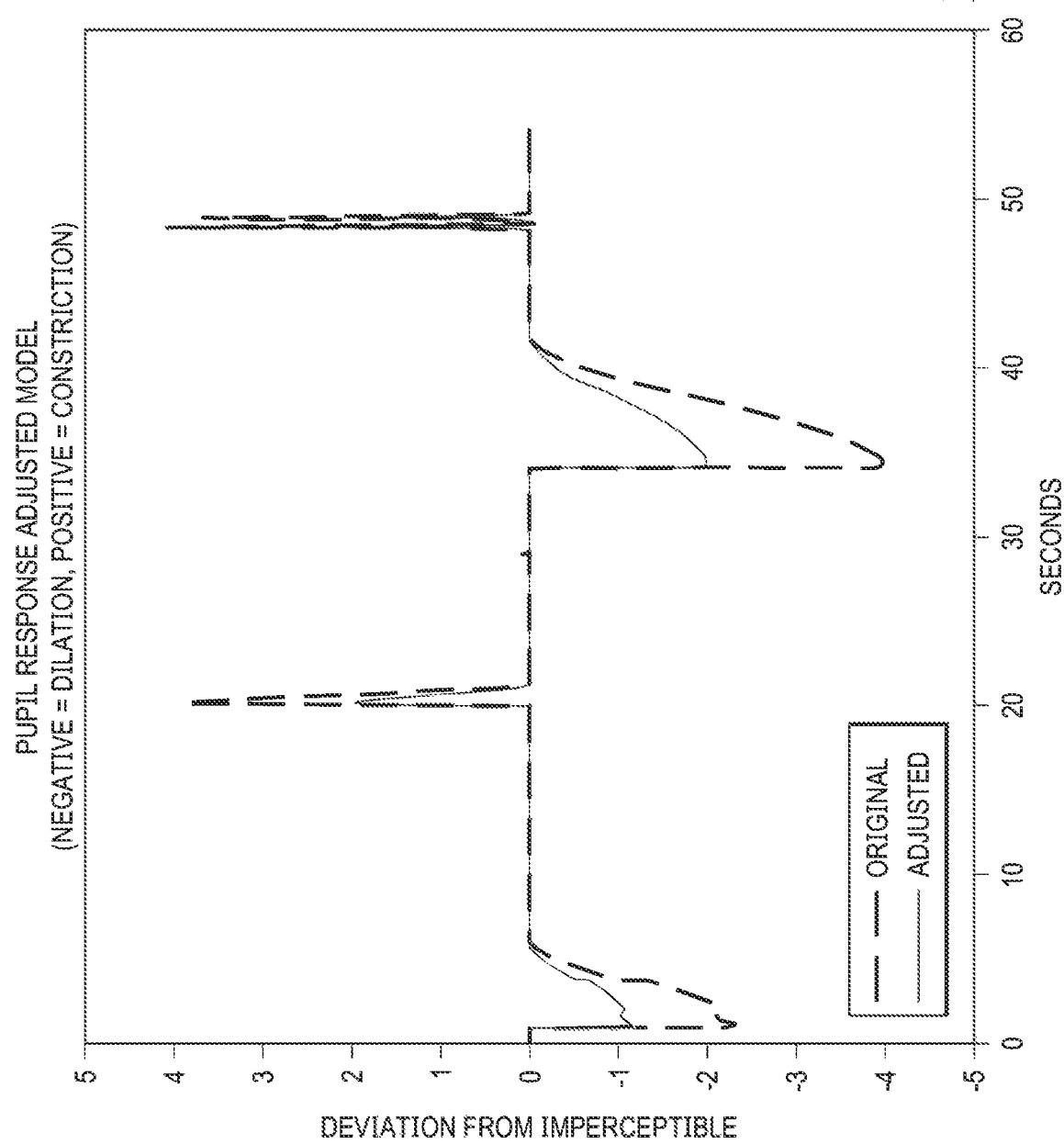

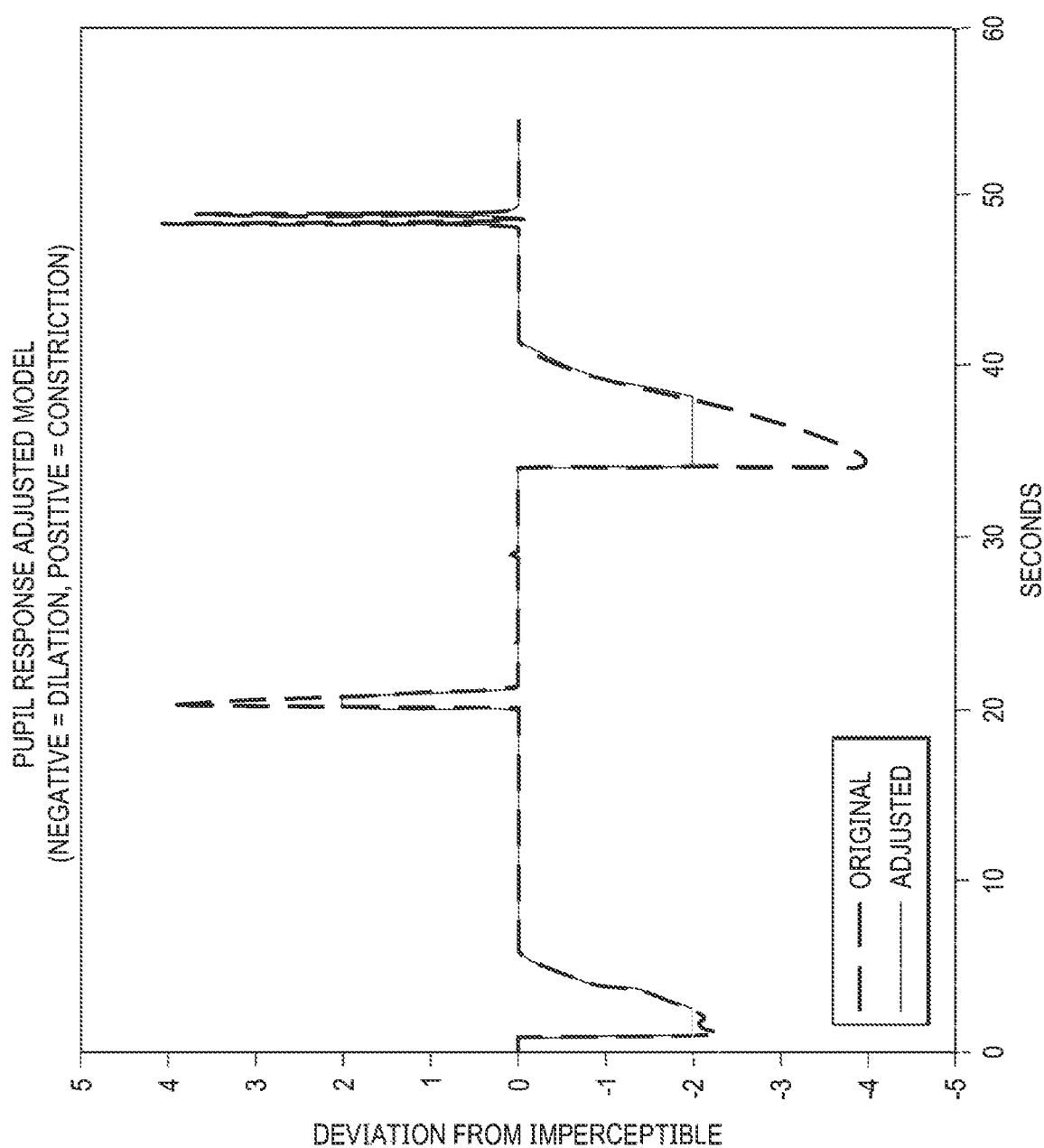

LUMINANCE ADJUSTMENT BASED ON VIEWER ADAPTATION STATE

1. CROSS-REFERENCE TO RELATED APPLICATIONS

This application is the US National Stage of PCT Application No. PCT/US2022/018542, filed 2 Mar. 2022, which claims priority to European Patent Application No. 21163880.4, filed 22 Mar. 2021 and US provisional application 63/164,165, filed 22 Mar. 2021, each of which is incorporated herein by reference in its entirety.

2. FIELD OF THE DISCLOSURE

This application relates generally to systems and methods of adjusting luminance based on an adaptation state of a viewer.

3. BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). As the luminance capabilities of HDR displays increases, viewers experience more drastic changes between dark and bright luminance that may cause discomfort.

Additionally, High Dynamic Range (HDR) content authoring is now becoming widespread as this technology offers more realistic and lifelike images than earlier formats. However, many display systems, including hundreds of millions of consumer television displays, are not capable of reproducing HDR images. Furthermore, because of the wide range of HDR displays (say, from 1,000 nits to 5,000 nits or more) HDR content optimized on one HDR display may not be suitable for direct playback on another HDR display. One approach being used to serve the overall market is to create multiple versions of new video content; say, one using HDR images, and another using SDR (standard dynamic range) images. However, this requires content authors to create their video content in multiple formats, and may require consumers to know which format to buy for their specific display.

BRIEF SUMMARY OF THE DISCLOSURE

HDR technology allows for content to be much brighter than previously provided. Brightness jumps in content, from dark to bright and bright to dark, can be an uncomfortable experience for a viewer of the content. Such brightness jumps may occur at image junctions such as channel changes or advertisement insertion, as well as used for creative effect. Accordingly, techniques for reducing such strain while maintaining an intended viewing experience of the content author have been developed. Techniques may further account for output device characteristics while maintaining the intended viewing experience.

Various aspects of the present disclosure relate to devices, systems, and methods for adjusting luminance based on a state of a viewer.

In one exemplary aspect of the present disclosure, there is provided a video delivery system for luminance adjustment based upon a viewer adaptation state. The video delivery system comprises a processor to perform post-production editing of video data. The processor is configured to: receive a source image including a current image frame including metadata corresponding to a mean luminance value of the current image frame, and the source image including an upcoming image frame including metadata corresponding to a mean luminance value of the upcoming image frame. The processor is configured to determine, for the current image frame and the upcoming image frame, an ambient luminance value based on an ambient luminance, and to determine, for the current image frame and the upcoming image frame, an incident luminance value based on the ambient luminance value and the mean luminance value. The processor is further configured to determine, using a model that estimates pupil size as a function of incident luminance, a current pupil size and a target pupil size, wherein the target pupil size is determined based on the incident luminance value of the upcoming image frame, and wherein the current pupil size is determined based on the incident luminance value of the current image frame and one or more previous image frames. The processor is further configured to determine a difference between the current pupil size and the target pupil size and to generate an output image by including in the source image metadata indicative of an expected change in pupil size between the current image frame and the upcoming image frame, wherein said metadata indicative of an expected change in pupil size is determined as a function of the difference between the current pupil size and the target pupil size.

In another exemplary aspect of the present disclosure, there is provided a method for luminance adjustment based upon a viewer adaptation state, the method comprising receiving a source image including a current image frame including metadata corresponding to a mean luminance value of the current image frame, and the source image including an upcoming image frame including metadata corresponding to a mean luminance value of the upcoming image frame, determining, for the current image frame and the upcoming image frame, an ambient luminance value based on an ambient luminance, determining, for the current image frame and the upcoming image frame, an incident luminance value based on the ambient luminance value and the mean luminance value, determining, using a model that estimates a pupil size as a function of incident luminance, a current pupil size and a target pupil size, wherein the target pupil size is determined based on the incident luminance value of the upcoming image frame, and wherein the current pupil size is determined based on the incident luminance value of the current image frame and one or more previous image frames, determining a difference between the current pupil size and the target pupil size, and generating an output image by including in the source image metadata indicative of an expected change in pupil size between the current image frame and the upcoming image frame, wherein said metadata indicative of an expected change in pupil size is determined as a function of the difference between the current pupil size and the target pupil size.

In another exemplary aspect of the present disclosure, there is provided a video delivery system for luminance adjustment based upon a viewer adaptation state. The delivery system comprises a processor to decode a received coded bit stream. The processor is configured to: receive an input image including a current image frame, and upcoming image frame, and metadata indicative of an expected change in pupil size between the current image frame and the upcoming image frame. The processor is further configured to determine, for the current image frame and the upcoming image frame, a target luminance value, to determine an ambient luminance value based on an ambient luminance, and to determine, for the current image frame and the upcoming image frame, an incident luminance value based on the ambient luminance value and the target luminance value. The processor is further configured to select a tone mapping curve based on a characteristic of a device configured to provide the image and to determine, using a model that estimates pupil size as a function of incident luminance, a current pupil size and a target pupil size, wherein the target pupil size is determined based on the incident luminance of the upcoming image frame, and wherein the current pupil size is determined based on the incident luminance of the current image frame and one or more previous image frames. The processor is further configured to determine a difference between the current pupil size and the target pupil size, alter the tone mapping curve based on the expected change in pupil size and the difference between the current pupil size and the target pupil size, and apply the altered tone mapping curve to the input image to generate an output image.

In another exemplary aspect of the present disclosure, there is provided a method for luminance adjustment based upon a viewer adaptation state. The method comprises: receiving an input image including a current image frame, an upcoming image frame, and metadata indicative of an expected change in pupil size between the current image frame and the upcoming image frame and determining, for the current image frame and the upcoming image frame, a target luminance value. The method further comprises determining an ambient luminance value based on an ambient luminance, determining, for the current image frame and the upcoming image frame, an incident luminance value based on the ambient luminance value and the target luminance value, and selecting a tone mapping curve based on a characteristic of a device configured to provide the image. The method further comprises determining, using a model that estimates pupil size as a function of incident luminance, a current pupil size and a target pupil size, wherein the target pupil size is determined based on the incident luminance of an upcoming image frame, and wherein the current pupil size is determined based on the incident luminance of a current image frame and one or more previous image frames, altering the tone mapping curve based on the expected change in pupil size and the difference between the current pupil size and the target pupil size, and applying the altered tone mapping curve to the input image to generate an output image.

In another exemplary aspect of the present disclosure, there is provided a non-transitory computer-readable medium storing instructions that, when executed by a processor of a video delivery system, cause the video delivery system to perform a method of the present disclosure.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which:

FIGS. 9A-9B depict example graphs illustrating a user preference setting.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that these are merely examples. It will further be understood that the disclosed systems and methods can be used in any device in which there is a need to project light; for example, cinema, consumer, and other commercial projection systems, heads-up displays, virtual reality displays, and the like. Disclosed systems and methods may be implemented in additional display devices, such as with an OLED display, an LCD display, a quantum dot display, or the like.

Video Coding of HDR Signals

Figure 1:
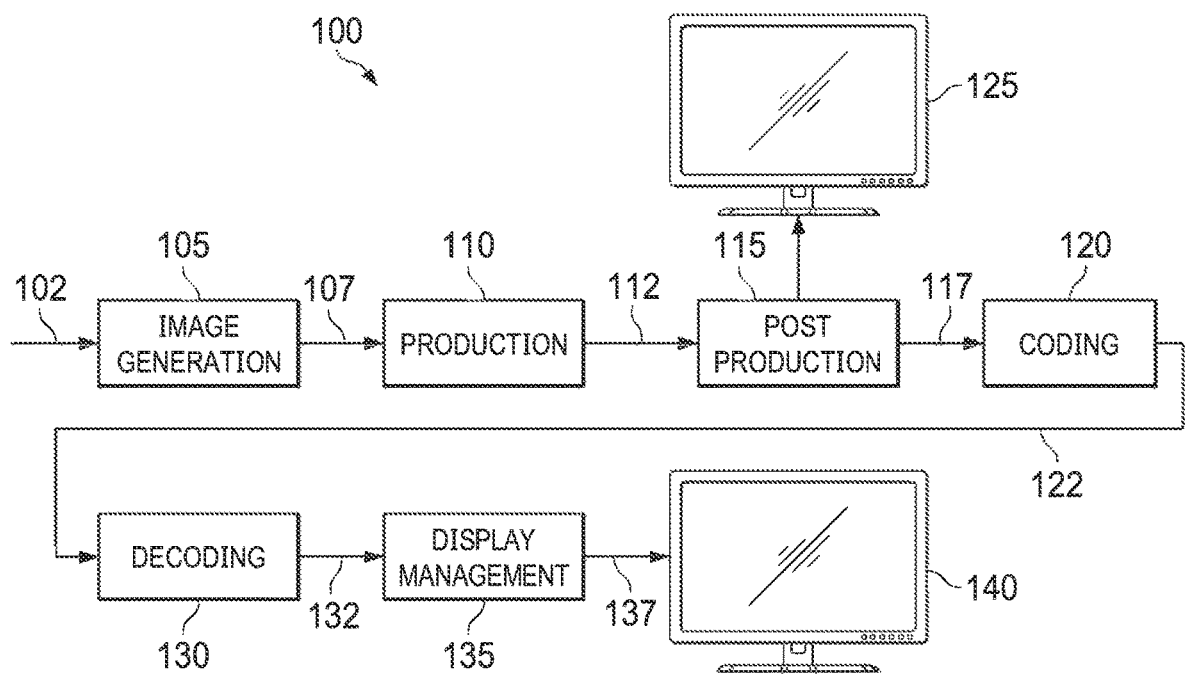
FIG. 1 depicts an example process for a video delivery pipeline.

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor (or one or more processors such as a central processing unit (CPU)) at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Methods described herein may be performed by the processor at block (115). Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Additional methods described herein may be performed by the decoding unit (130) or the display management block (135). Both the decoding unit (130) and the display management block (135) may include their own processor, or may be integrated into a single processing unit.

Brightness Adaptation

As stated above, jumps in brightness can create uncomfortable viewing experiences for those viewing video content. Accordingly, systems and methods provided herein maintain creative intent of a content creator based on a viewer's state of adaptation. The viewer state of adaptation may be, for example, the speed at which the pupils of the viewer react to the change in brightness, as described in more detail below. Maintaining the creative intent in such a manner is accomplished by modeling both the content creator's state of adaptation and the observer's state of adaptation at any given point while watching a sequence of changing frames. Specifically, a model estimates a change in pupil diameter of a viewer based on the output luminance of the device as the video content is provided. Additional information may be further accounted for, such as ambient light, screen reflection, and chromatic adaptation.

Method of Creating Content

Figure 2:
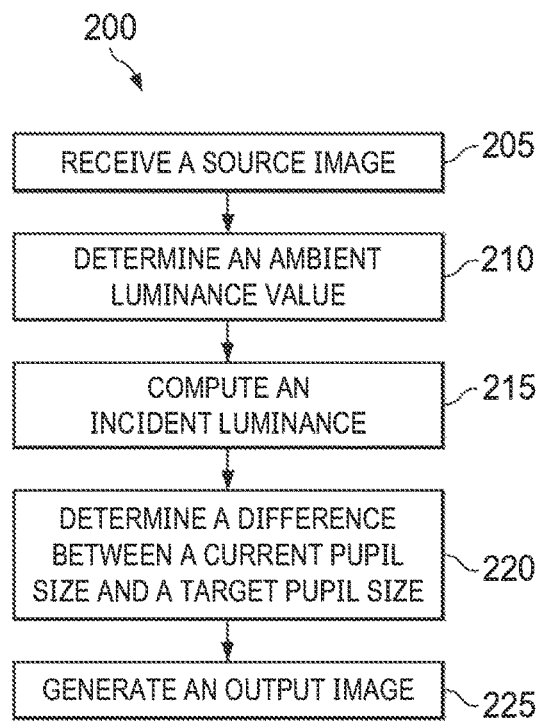
FIG. 2 depicts an example process for luminance adjustment based on a viewer adaptation state.

In order to maintain creative intent of a content creator, the creative experience is measured during content creation and converted into metadata. FIG. 2 provides a method (200) for luminance adjustment of content based on a reference adaptation state. The method (200) includes, at step (205), receiving a source image, such as the video data (107). The source image may include a current image frame (e.g., the frame of the video data (107) currently being viewed). The source image may also include metadata associated with the current image frame. For example, an image "Smid." which represent the luminance level proportional to a perceived brightness of the source image, may be stored in L1 metadata that describes the mean image luminance of the source image. In some embodiments, the Smid value is a measurement of the average (e.g., arithmetic, median, geometric) luminance provided by the source image when the source image is displayed on the reference display (125). The Smid value may be estimated to be equivalent to the average of the Perceptual-Quantizer (PQ)-encoded maximum color component (RGB) values within the source image. In some other embodiments, the Smid value may denote the average or median of a selected region (for example, a face). In instances where the L1 metadata is not available, the Smid may be calculated, or may be assumed (such as at a value of 0.36).

The source image may further include an upcoming (e.g., future) image frame. The upcoming image frame may be the frame directly subsequent to the current image frame, or an image frame several frames behind the current image frame. Accordingly, the production phase (110) may receive a current image frame, an upcoming image frame, and/or both.

The method (200) includes, at step (210), determining an ambient luminance value based on an ambient luminance. For example, an ambient luminance of an area surrounding the reference display (125) is determined. This may be accomplished using ambient light sensors that detect luminance values of light, color of light, and the like. The ambient luminance value may be determined by communication with smart devices, such as smart light bulbs that communicate the color of light they provide to an external device. The time of day may be accounted for when determining the ambient luminance value, as the time of day may be associated with a typical illumination (for example, brighter at daytime, darker at nighttime). A value of 5 cd/m² may be used as a default value when no ambient luminance value is known and cannot be determined.

Figure 3:
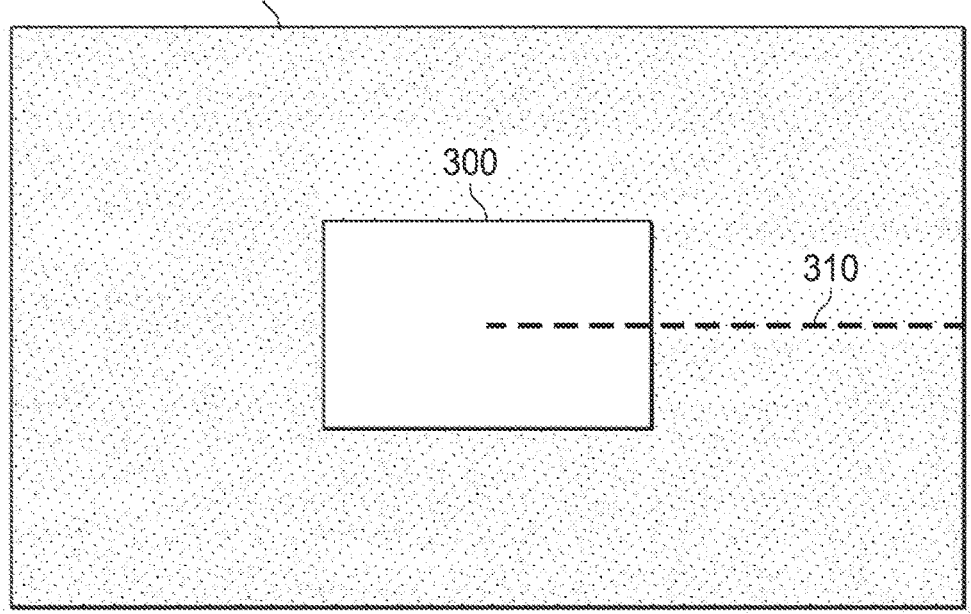
FIG. 3 depicts an example two-dimensional display environment.

The method (200) includes, at step (215), computing an incident luminance. The incident luminance provides an estimation of light falling on the eyes of a viewer, and may be based on both the ambient luminance value from step (210) and the mean luminance value from step (205). FIG. 3, for example, provides a display (300) (e.g., the reference display (125)) within a surrounding ambience (305). The display (300) has a first luminance value, such as the mean luminance value from step (205). The surrounding ambience (305) has a second luminance value, such as the ambient luminance value from step (210). The size of the display (300) relative to surrounding ambience (305) is dependent on both the size of the screen of the display (300) and the viewing distance (e.g., how far the display (300) is from the eyes of the viewer). Cross-section line (310) will be discussed in conjunction with FIG. 4 below.

Figure 4:
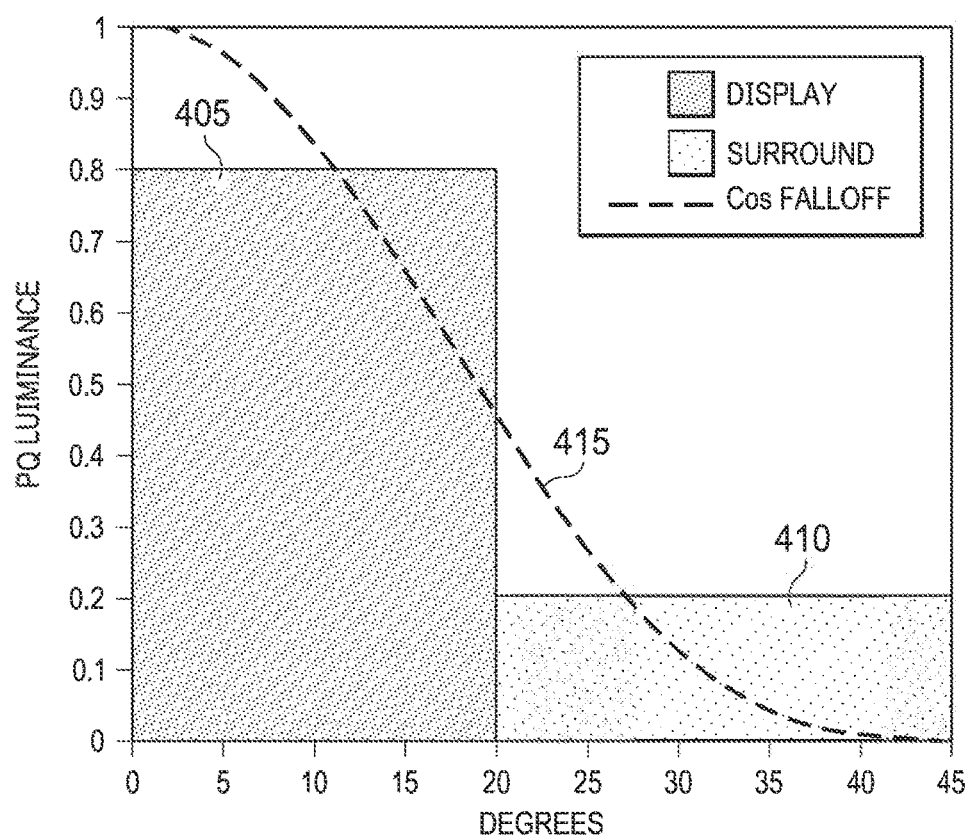
FIG. 4 depicts an example one-dimensional cross-section of the display environment of FIG. 3.

The incident luminance may be calculated using a cosine cubed function. FIG. 4, for example, provides a graph (400) illustrating a cosine cubed falloff function (415). The graph (400) is a one-dimensional cross-section along line (310) of FIG. 3. The graph (400) includes mean luminance value (405) corresponding to the luminance of the display (300), and an ambient luminance value (410) corresponding to the surrounding ambience (305). In some embodiments, the cosine cubed falloff function (415) is multiplied by the mean luminance value (405) and the ambient luminance value (410) to scale the cosine cubed falloff function (415) to a given scenario. The Y-coordinate provides luminance values, while the X-coordinate provides values of visual degrees. In some embodiments, the cosine cubed falloff function (415) is scaled such that the area under the curve is 1 and the maximum degrees is 45. While the cosine cubed falloff function (415) provides an estimation of experienced luminance based on gaze position, other embodiments may be contemplated based on the visual influence of the ambient luminance. For example, the same method can be adjusted for two-dimensional and three-dimensional scenarios.

As one particular example of the operations of step (215), pseudocode for calculating the incidence luminance using the mean luminance value (405), ambient luminance value (410), and the cosine cubed falloff function (415) is provided below:

% Find the display angle in degrees display_deg=min(45,arctan((screenWidth/2)/Viewing-Distance));

% Create a function that is the integral of cos(2x)^3 normalized to area of 1 func=@(x)½*sine(2*x)+⅙*sine(2*x)^3;

func=@(x)func(x)/func(45);

% Calculate the incident luminance incident_Lum=display_Y*func(display_deg)+surround_Y*(1−func(display_deg));

The incident luminance may be determined for both the current image frame and the upcoming image frame. In some embodiments, while the ambient luminance value (410) does not change, the mean luminance value (405) varies based on the image provided on the display (300). A difference between the incident luminance for the current image frame and the incident luminance for the upcoming image frame may be determined, as discussed further below. In the pseudocode above, incident_Lum provides an estimate of the incident luminance falling on the eyes of the viewer, which may influence or alter the pupil diameter of the eyes (e.g., spatially compensated corneal flux in cd/m²), display_Y represents the mean luminance value, and surround_Y represents the ambient luminance value.

Figure 5:
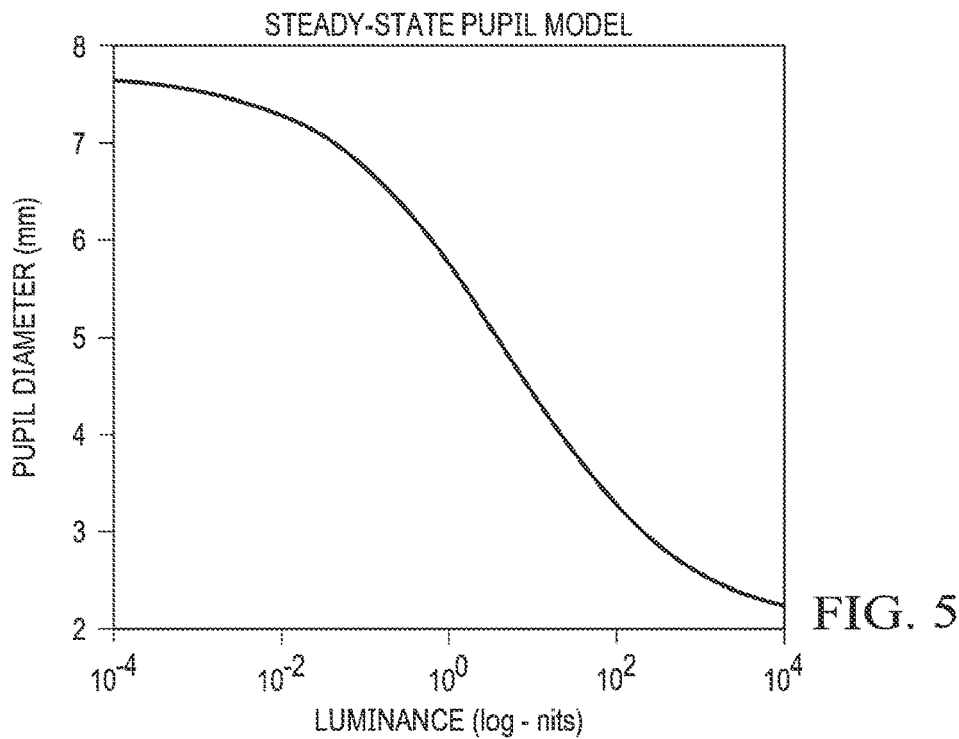
FIG. 5 depicts an example model of a steady-state pupil.

Returning to FIG. 2, the method (200) includes determining a difference between a current pupil size and a target pupil size at step (220). The current pupil size is a function of the incident luminance and correlates with how the pupil reacts to the upcoming image frame the instant it is shown (i.e., as soon as the switch occurs between the current image frame and the upcoming image frame). In some embodiments, the current pupil size is a continuous filtered result to represent the adaptation of the pupil over time (e.g., from frame to frame). In this manner, the current pupil size may be a function of all previous frames, and how the pupil size changes from frame to frame may also be referred to as an adapted pupil size. In some embodiments, the current pupil size may be determined using a sensor, such as an eye tracking sensor. The sensor observes the pupil size and provides a measurement of the pupil size. The target pupil size correlates with the instantaneous desired pupil diameter for the upcoming image frame. In this manner, the target pupil size may not account for previous frames, and represents the pupil diameter that would be achieved by staring at the upcoming image frame for a long period of time. The difference between the current pupil size and the target pupil size may be defined as a delta pupil response, provided in Equation 1:

$$\Delta PR = d_{currentPupil} - d_{targetPupil} \quad \text{[Equation 1]}$$

where:

$\Delta PR$=Delta Pupil Response $d_{currentPupil}$=Diameter of Current Pupil Size $d_{targetPupil}$=Diameter of Target Pupil Size FIG. 5 provides a steady-state pupil model to estimate and/or predict pupil diameter with respect to incident luminance. The steady-state pupil model presented in FIG. 5 is directly adapted from that presented in the paper "A Unified Formula for Light-Adapted Pupil Size" by A. B. Watson and J. I. Yellot, which is hereby incorporated by reference in its entirety. It is possible to utilize alternative models and methodologies to determine the steady-state pupil size. In the model of FIG. 5, the constant rate of constriction of the pupil is 3 mm/s and the dilation of the pupil is 0.5 mm/s. However, other constant rates of constriction and dilations may be utilized. In one embodiment, the color of an image may also influence the rate of constriction. Pupil diameter may further vary based on degree area, number of eyes, and age. The pupil works to achieve a steady-state pupil size based on the incident luminance, and either constricts or dilates depending on whether the target pupil size is larger or smaller than the current pupil size. To determine how the pupil changes in response to the incident luminance, both the constriction and dilation have estimated velocities for the sampling rate of the image frames (represented mathematically by the reciprocal of the image frame rate). As one particular example, pseudocode for determining the difference between the current pupil size and the target pupil size (e.g., a delta pupil response), as in step (220), is provided below. In this example, the exact method of estimation of the steady-state pupil size is left ambiguous.

```
%Calculate the steady state pupil diameter
desired_pupil = calculatePupil(incidentXYZ);
if desired_pupil > previous_pupil
   %Approach target pupil diameter at dilation velocity (0.5 mm/s) and sample rate
   current_pupil = min(desired_pupil, previous_pupil + 0.5 * 1/FrameRate);
else
   %Approach target pupil diameter at constriction velocity (3 mm/s) and sample rate
   current_pupil = max(desired_pupil, previous_pupil - 3.0 * 1/FrameRate);
end
%Store pupil for next time
previous_pupil = current_pupil;
```

In the above pseudocode, the current pupil is the diameter of the pupil given the frame that is going to be shown, along with the duration of that frame.

Returning to FIG. 2, the method (200) includes, at step (225), generating an output image. The output image may be generated by modifying the source image (e.g., video data (107)) based on a determined luminance adjustment factor. The luminance adjustment factor may be based on, for example, the delta pupil response. To minimize discomfort experienced by a viewer of the video data (107), a relationship is derived between the delta pupil response and experienced discomfort. For example, as provided in Equation 2:

$$\text{Perceived Discomfort}(\Delta PR) = 4.354 * e^{\frac{-(\Delta PR - 0.1314)^2}{2.335}} \quad \text{[Equation 2]}$$

where:

ΔPR=Delta Pupil Response.

While Equation 2 provides an exponential function, other functions may be used to determine the perceived discomfort, such as a cubic roll-off function. The perceived discomfort is accounted for when generating the output image at step (225). As one particular example, pseudocode is provided below for converting the perceived discomfort to a "creative experience" (CE) value, which is a value that indicates the change in size of the pupils. Specifically, the CE value is used to describe how an observer reacts to changing luminance levels across the duration of presented content.

Figure 6:
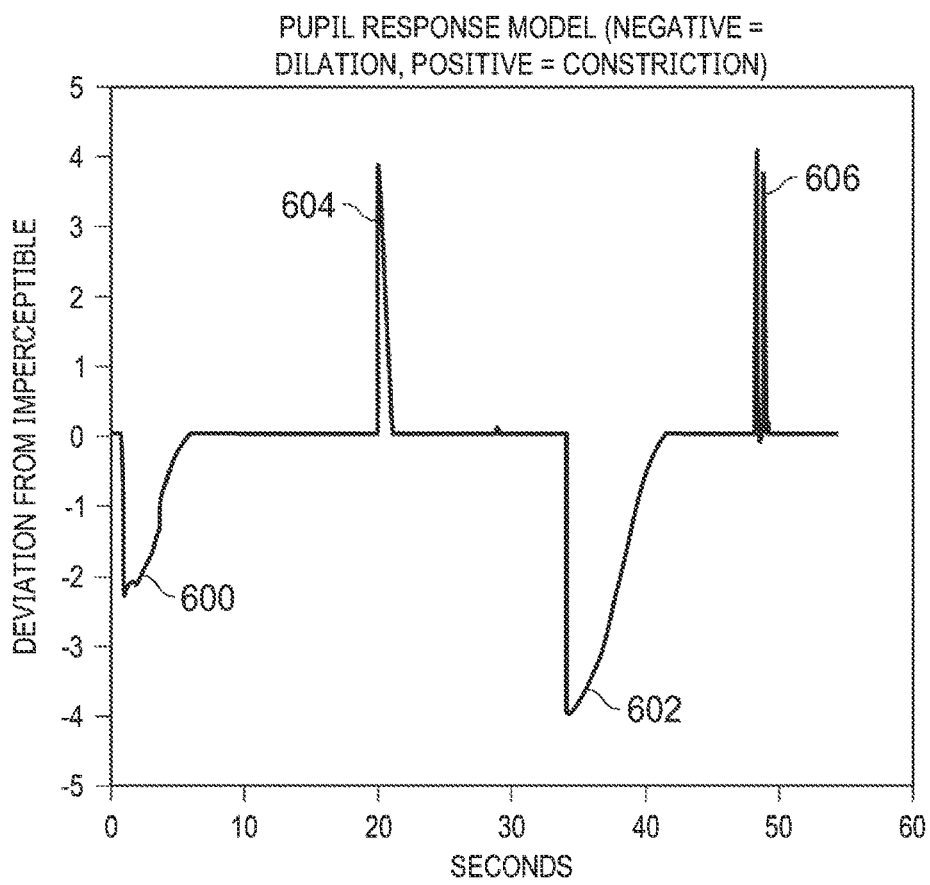
FIG. 6 depicts an example model of a pupil response to change in experienced luminance.

In the provided example, functions to determine the output image luminance are selected such that the CE value is negative when the pupil dilates, is positive when the pupil constricts, and is zero when the pupil diameter is constant (e.g., does not change). FIG. 6 provides one example of the CE value determined over a plurality of image frames. FIG. 6 contains several instances of changes between bright and dark luminance values. For example, the pupil dilates during dip (600) and dip (602), indicating a change to a dark luminance value at dip (600) and dip (602). The pupil constricts at rise (604) and (606), indicating a change to a brighter luminance value at rise (604) and rise (606). The CE value is determined for each frame included in the video content, and is transformed into metadata included in the coded bit stream (122).

Method of Implementing Creative Experience Metadata

Figure 7:
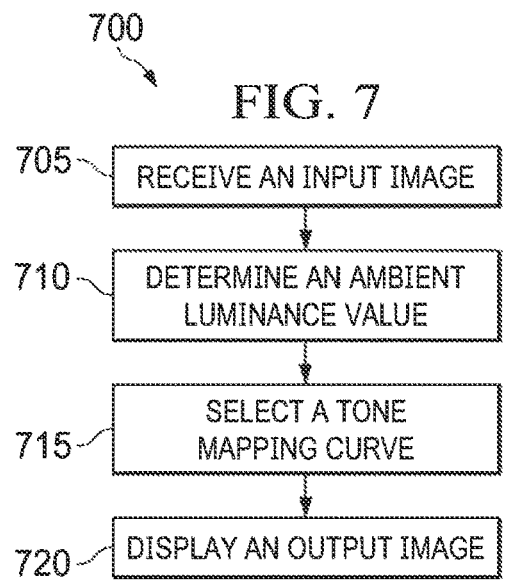
FIG. 7 depicts an example process for luminance adjustment based on received metadata.

While decoding the coded bit stream (122), the decoding unit (130) processes the CE value included in the metadata and may adjust the decoded signal (132) accordingly. FIG. 7 provides a method (700) for decoding the coded bit stream (122). The method (700) includes, at step (705), receiving an input image, such as data included in the coded bit stream (122). The method (700) includes, at step (710), determining an ambient luminance value based on an ambient luminance. For example, an ambient luminance of an area surrounding the target display (140) is determined, as described above with respect to step (210).

The method (700), at step (715), selects a tone mapping curve based on a characteristic of the target device (140). For example, a "Tmid" value is calculated, providing an estimate of the average luminance for the image described by the coded bit stream (122) (e.g., a target luminance value), when the image is displayed on the target device (140). In U.S. Pat. No. 10,600,166, "Tone Curve Mapping for High Dynamic Range Images," by J. Pytlarz and R. Atkins, which is incorporated herein by reference in its entirety, the inventors propose methods for determining a tone curve for display mapping of high dynamic range (HDR) images. The tone mapping curve may further be adjusted using functions to make the input image brighter (resulting in a higher CE value) or darker (resulting in a lower CE value). As one particular example, pseudocode is provided below for calculating the Tmid value.

```
% Find the tone-mapped Smid
% DBrightness=brightening function
% DBacklight=darkening function
Tmid=ToneMap(Smid, DBrightness, DBacklight)
```

A predicted CE value for the given target device (140) may be determined by using a dynamic look-up-table that compares the CE value with the input tone curve parameters. This may be used to ensure the selected tone mapping curve is appropriate for the target device (140). Once the tone mapping curve is determined, a predicted CE value may be determined using the tone mapping curve. For example, using the tone mapping curve values, the Tmid value, incident luminance, and current and target pupil sizes of a viewer are determined, as described above with respect to method (200), for each frame included in the coded bit stream (122). These are used to calculate a predicted CE value for each frame. The predicted CE value may then be compared to the received CE value to determine how to adjust the luminance of each image to achieve the desired output. As one particular example, pseudocode is provided below to determine an intersection between the predicted CE value and the actual provided CE value, as received in the metadata of the coded bit stream (122).

```
%Determine the tone curve adjustments to maintain CE
slider = -1:0.5:1;
%Loop through the slider to find the CE values
for i = 1:numel(slider)
```

```
%Convert from slider to DBrightness/DBacklight
DBrightness = max(0, slider(i));
DBacklight = max(0, slider(i) * (-1));
%Calculate the Tmid of the image
Tmid = ToneCurve(Smid, DBrightness, DBacklight);
%Compute incident luminance
incident_Lum = calcIncidentLum(Tmid, surround_Y);
%Predict current and target pupil diameters
[current_pupil, desired_pupil] = findPupil(incident_Lum, previous_pupil);
%Determine CE value
CE(i) = calcCE(current_pupil, desired_pupil);
end
%Determine the CE intersection point by linear interpolation
chosenSlider = interp1(slider, CE, metadataCE)
```

Figure 8:
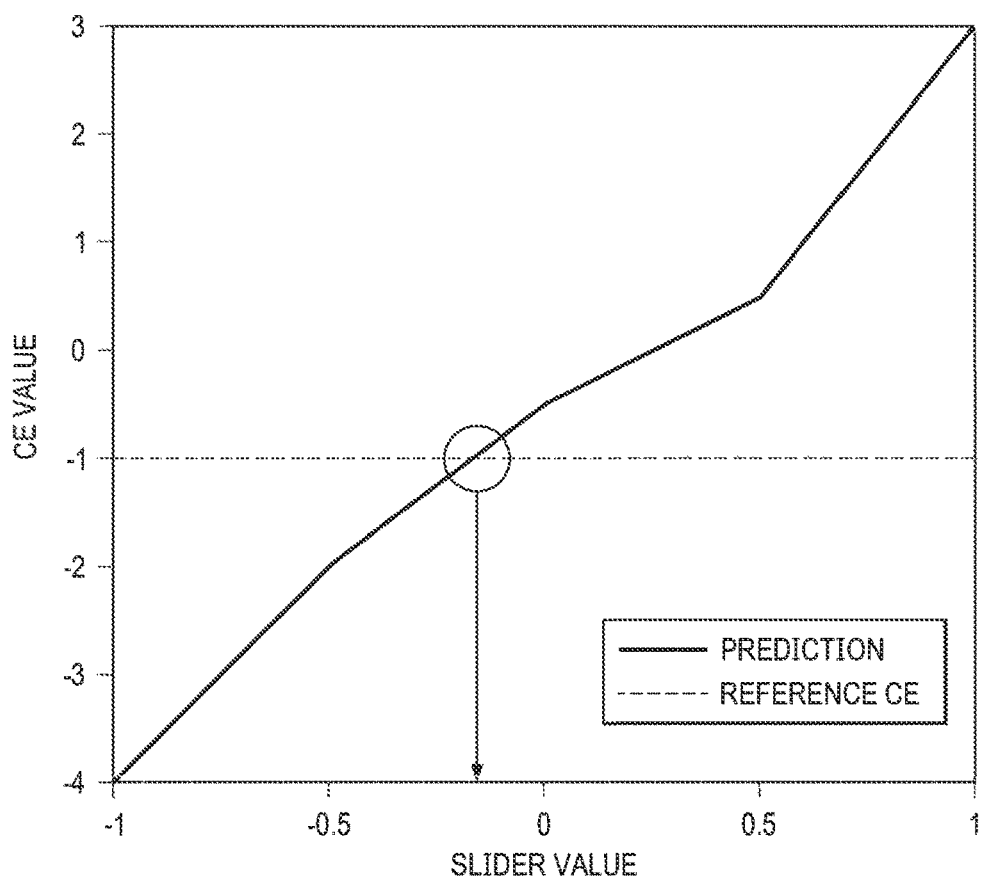
FIG. 8 depicts an example graph for determining a slider value.

FIG. 8 illustrates a graph providing this intersection between the predicted CE value and the provided CE value (e.g., reference CE value). In the example of FIG. 8, the provided CE value, indicated by the dashed line, is −1. The solid line provides the calculated CE value, as determined by the calculated Tmid value of the given device at each slider value. The intersection provides the slider value the target display (140) must use to output the desired CE value. In the example of FIG. 8, the slider value is approximately −0.15. Accordingly, the luminance of the image will be lowered to output the desired CE value.

Returning to FIG. 7, at step (720), the method (700) displays an output image using the slider value determined at step (715). Accordingly, the output image has a creative experience that corresponds to the luminance indicated by the CE value included in the metadata of the coded bit stream (122). In other words, the output image is brightened or darkened in order to achieve the luminance indicated by the CE value. Method (700) is performed for each frame provided in the video data, such that all frames are output with a creative experience value intended by the content creator.

Example Implementations

By using a tone mapping curve for each device, the creative experience desired by the content creator of the video data can be achieved regardless of the capabilities of the user device, closing the gap in viewing differences between devices such as home theaters compared to mobile phones. However, the methods described herein may be used to reduce discomfort in changing luminance for a variety of cases. One such embodiment includes reducing viewer discomfort during fast-forward functions. When fast-forward is initiated, frames are rapidly skipped and displayed. When frames change from dark to bright and bright to dark, a strobing effect may occur. To combat this, the sampling rate over which the pupil calculations occur at steps (220) and (715) may be increased based on the rate of fast-forward. For example, one video includes a person exiting a cave into bright sunlight, resulting in a luminance change from dark to bright. This may occur over 10 seconds. However, if fast-forward is initiated such that the scene occurs over 5 seconds, the pupil adaptation rate changes substantially. The mapping of the CE value to the tone mapping curve may be adjusted in this case by reducing the adaptation duration by a 50% factor to account for this change in time. The speed of constriction and dilation will be increased proportionally based on the fast-forward speed due.

Another embodiment in which methods disclosed herein may be implemented is a zoom function. When zoom is activated, focus turns to a portion of an image, which may significantly change the average luminance of the image. A user may move between portions of the image themselves, switching between dark areas of interest and bright areas of interest, causing discomfort. Knowledge of the luminance attributes of the zoomed-in regions may provide for dampening or brightening to more closely achieve the desired creative experience.

Methods described herein may be used for volumetric experiences, such as virtual reality gaming. Observers develop a level of adaptation to a computer-generated landscape within the virtual reality experience. As observers move and look around, the sudden reveal of bright objects or reflections may be jarring to the observer. Similar adjustments to images or objects being viewed may be applied to limit viewing discomfort from changes in luminance. In some embodiments, multiple users may be in the same virtual reality experience at the same time. Each user may be looking at different objects, resulting in different experiences that may give one gamer an advantage. Luminance may be adjusted to further balance the experiences and even the field for each.

Advertisements may be inserted into videos being viewed by a user, which may drastically change the average luminance value being displayed, regardless of device type. In such an instance, the CE value may be used to apply a smooth comfortable transition. For example, during a dark scene in a movie, an advertisement is provided with a bright luminance value. Using the CE value of both the movie and the advertisement, the provided image frames compensate for the sudden change by lowering the brightness of the advertisement and slowly increasing the brightness over time, until the advert is complete and then fading back to match the CE value of the movie.

Viewers of the video content may wish to set a luminance preference, such as limiting certain levels of discomfort unique to the viewer and/or device. For example, very bright content may be limited to only reach creative experience values lower than indicated by the CE metadata. Additionally, brightness jumps may be restricted. For example, FIG. 9A provides an example of luminance adjustment to limit experienced discomfort while preserving intended luminance changes. The overall intended viewing experience is maintained, but the extremes in luminance are limited to minimize change in pupil response. In other implementations, a hard cutoff may be used instead of a general scalar. For example, FIG. 9B provides an example of luminance adjustment with a strict threshold. User preference may further be split based on constriction and dilation information. For example, only constriction may have a set threshold, or only dilation may have a set threshold. Both constriction and dilation may have unique thresholds different from the other.

In some implementations, methods described herein may be implemented to provide a viewing experience similar to how it was originally captured. For example, users may capture images using a camera. The image is processed such that it includes CE metadata indicating a luminance value of the original scene. Accordingly, when the picture is viewed on other devices, the image is provided in a way similar to how it was originally captured.

The above video delivery systems and methods may provide for luminance adjustment based upon a viewer adaptation state. Systems, methods, and devices in accordance with the present disclosure may take any one or more of the following configurations.

(1) A video delivery system for luminance adjustment based upon a viewer adaptation state, the video delivery system comprises a processor to perform post-production editing of video data, the processor is configured to: receive a source image including a current image frame including metadata corresponding to a mean luminance value of the current image frame, and the source image including an upcoming image frame including metadata corresponding to a mean luminance value of the upcoming image frame, determine an ambient luminance value based on an ambient luminance, determine, for the current image frame and the upcoming image frame, an incident luminance value based on the ambient luminance value and the mean luminance value, determine a difference between a current pupil size and a target pupil size, wherein the target pupil size is determined based on the incident luminance value of the upcoming image frame, and wherein the current pupil size is determined based on the incident luminance value of the current image frame and one or more previous image frames, and generate an output image by modifying the source image based on a luminance adjustment factor, the luminance adjustment factor being a function of the difference between the current pupil size and the target pupil size.

(2) The video delivery system according to (1), wherein the determining the ambient luminance value includes at least one of receiving the ambient luminance value from one or more ambient light sensors, receiving the ambient luminance value from one or more smart light devices, or determining the ambient luminance value based on a time of day.

(3) The video delivery system according to any one of (1) to (2), wherein determining the incident luminance value includes applying a cosine cubed function to the mean luminance value and the ambient luminance value to obtain an average adaptation state.

(4) The video delivery system according to (3), wherein the current pupil size and the target pupil size are adjusted based on the average adaptation state.

(5) The video delivery system according to (3), wherein the cosine cubed function is scaled such that the integral of the cosine cubed function over a 45° range is 1.

(6) The video delivery system according to any one of (1) to (5), wherein the output image includes metadata corresponding to the mean luminance value of the source image.

(7) The video delivery system according to any one of (1) to (6), wherein the luminance adjustment factor is negative when the difference between the current pupil size and the target pupil size is negative, and wherein the luminance adjustment factor is positive when the difference between the current pupil size and the target pupil size is positive.

(8) The video delivery system according to any one of (1) to (7), wherein the output image includes metadata indicating a desired change in pupil size between the current image frame and the upcoming image frame given infinite adaptation time.

(9) The video delivery system according to any one of (1) to (8), wherein the luminance adjustment factor is based on an estimated discomfort value, the estimated discomfort value being based on the difference between the current pupil size and the target pupil size.

(10) The video delivery system according to any one of (1) to (9), wherein the incident luminance value is an estimate of light on a pupil of a viewer of the video data.

(11) A method for luminance adjustment based upon a viewer adaptation state, the method comprising: receiving a source image including a current image frame including metadata corresponding to a mean luminance value of the current image frame, and the source image including an upcoming image frame including metadata corresponding to a mean luminance value of the upcoming image frame, determining an ambient luminance value based on an ambient luminance, determining, for the current image frame and the upcoming image frame, an incident luminance value based on the ambient luminance value and the mean luminance value, determining a difference between a current pupil size and a target pupil size, wherein the target pupil size is determined based on the incident luminance value of the upcoming image frame, and wherein the current pupil size is determined based on the incident luminance value of the current image frame and one or more previous image frames, and generating an output image by modifying the source image based on a luminance adjustment factor, the luminance adjustment factor being a function of the difference between the current pupil size and the target pupil size.

(12) The method according to (11), wherein the determining the ambient luminance value includes at least one of receiving the ambient luminance value from one or more ambient light sensors, receiving the ambient luminance value from one or more smart light devices, or determining the ambient luminance value based on a time of day.

(13) The method according to any one of (11) to (12), wherein determining the incident luminance value includes applying a cosine cubed function to the mean luminance value and the ambient luminance value to obtain an average adaptation state.

(14) The method according to (13), wherein the current pupil size and the target pupil size are adjusted based on the average adaptation state.

(15) The method according to (13), wherein the cosine cubed function is scaled such that the integral of the cosine cubed function over a 45° range is 1.

(16) The method according to any one of (11) to (15), wherein the output image includes metadata corresponding to the mean luminance value of the source image.

(17) The method according to any one of (11) to (16), wherein the luminance adjustment factor is negative when the difference between the current pupil size and the target pupil size is negative, and wherein the luminance adjustment factor is positive when the difference between the current pupil size and the target pupil size is positive.
(18) The method according to any one of (11) to (17), wherein the output image includes metadata indicating a desired change in pupil size between the current image frame and the upcoming image frame given infinite adaptation time.
(19) The method according to any one of (11) to (18), wherein the luminance adjustment factor is based on an estimated discomfort value, the estimated discomfort value being based on the difference between the current pupil size and the target pupil size.
(20) A non-transitory computer-readable medium storing instructions that, when executed by an electronic processor, cause the electronic processor to perform operations comprising the method of any one of (11) to (19).
(21) A video delivery system for luminance adjustment based upon a viewer adaptation state, the delivery system comprising a processor to decode a received coded bit stream, the processor configured to: receive an input image including a current image frame, an upcoming image frame, and metadata corresponding to an expected change in pupil size, determine, for the current image frame and the upcoming image frame, a target luminance value, determine an ambient luminance value based on an ambient luminance, determine, for the current image frame and the upcoming image frame, an incident luminance value based on the ambient luminance value and the target luminance value, select a tone mapping curve based on a characteristic of a device configured to provide the image, determine a difference between a current pupil size and a target pupil size, wherein the target pupil size is determined based on the incident luminance of the upcoming image frame, and wherein the current pupil size is determined based on the incident luminance of the current image frame and one or more previous image frames, alter the tone mapping curve based on the expected change in pupil size and the difference between the current pupil size and the target pupil size, and apply the altered tone mapping curve to the input image to generate an output image.
(22) The video delivery system according to (21), wherein the altered tone mapping curve is negative when the difference between the current pupil size and the target pupil size is negative, and wherein the altered tone mapping curve is positive when the difference between the current pupil size and the target pupil size is positive.
(23) The video delivery system according to any one of (21) to (22), wherein determining the tone mapping curve includes comparing the target luminance value of the current image frame to a look-up table to obtain input tone curve parameters.
(24) The video delivery system according to (23), wherein determining the tone mapping curve includes determining an intersection between the target luminance value of the current image frame and the input tone curve parameters.
(25) The video delivery system according to any one of (21) to (24), wherein the processor is further configured to receive a minimum and a maximum of the altered tone mapping curve by a user input.
(26) The video delivery system according to any one of (21) to (25), wherein the determining the ambient luminance value includes at least one of receiving the ambient luminance value from one or more ambient light sensors, receiving the ambient luminance value from one or more smart light devices, or determining the ambient luminance value based on a time of day.
(27) The video delivery system according to any one of (21) to (26), wherein determining a difference between a current pupil size and a target pupil size further includes adjusting a sampling rate upon detection of a fast-forward event being initiated.
(28) The video delivery system according to any one of (21) to (27), wherein applying the altered tone mapping curve to the input image increases the target luminance value of the input image.
(29) The video delivery system according to any one of (21) to (28), wherein applying the altered tone mapping curve to the input image decreases the target luminance value of the input image.
(30) The video delivery system according to any one of (21) to (29), wherein a maximum and a minimum of the tone mapping curve is adjusted based on a user preference setting.
(31) A method for luminance adjustment based upon a viewer adaptation state, the method comprising: receiving an input image including a current image frame, an upcoming image frame, and metadata corresponding to an expected change in pupil size, determining, for the current image frame and the upcoming image frame, a target luminance value, determining an ambient luminance value based on an ambient luminance, determining, for the current image frame and the upcoming image frame, an incident luminance value based on the ambient luminance value and the target luminance value, selecting a tone mapping curve based on a characteristic of a device configured to provide the image, determining a difference between a current pupil size and a target pupil size, wherein the target pupil size is determined based on the incident luminance of an upcoming image frame, and wherein the current pupil size is determined based on the incident luminance of a current image frame and one or more previous image frames, altering the tone mapping curve based on the expected change in pupil size and the difference between the current pupil size and the target pupil size, and applying the altered tone mapping curve to the input image to generate an output image.
(32) The method according to (31), wherein the altered tone mapping curve is negative when the difference between the current pupil size and the target pupil size is negative, and wherein the altered tone mapping curve is positive when the difference between the current pupil size and the target pupil size is positive.
(33) The method according to any one of (31) to (32), wherein determining the tone mapping curve includes comparing the target luminance value of the current image frame to a look-up table to obtain input tone curve parameters.
(34) The method according to (33), wherein determining the tone mapping curve includes determining an intersection between the target luminance value of the current image frame and the input tone curve parameters.
(35) The method according to any one of (31) to (34), further comprising receiving a minimum and a maximum of the altered tone mapping curve by a user input.
(36) The method according to any one of (31) to (35), wherein the determining the ambient luminance value includes at least one of receiving the ambient luminance value from one or more ambient light sensors, receiving the ambient luminance value from one or more smart light devices, or determining the ambient luminance value based on a time of day.
- (37) The method according to any one of (31) to (36), wherein determining a difference between a current pupil size and a target pupil size further includes adjusting a sampling rate upon detection of a fast-forward event being initiated.
- (38) The method according to any one of (31) to (37), wherein applying the altered tone mapping curve to the input image increases the target luminance value of the input image.
- (39) The method according to any one of (31) to (38), wherein a maximum and a minimum of the tone mapping curve is adjusted based on a user preference setting.
- (40) A non-transitory computer-readable medium storing instructions that, when executed by an electronic processor, cause the electronic processor to perform operations comprising the method of any one of (31) to (39).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A video delivery system for luminance adjustment based upon a viewer adaptation state, the delivery system comprising:
   a processor to perform post-production editing of video data, the processor configured to:
   receive a source image including a current image frame including metadata corresponding to a mean luminance value of the current image frame, and the source image including an upcoming image frame including metadata corresponding to a mean luminance value of the upcoming image frame;
   determine an ambient luminance value based on an ambient luminance;
   determine an incidence luminance value of the current image frame based on the ambient luminance value and the mean luminance value of de current image frame;
   determine an incidence luminance value of the upcoming mage frame based on the ambient luminance value and the mean luminance value of the upcoming image frame;
   determine, using a model that estimates pupil size as a function of incident luminance, a current pupil size and a target pupil size, wherein the target pupil size is determined based on the incident luminance value of the upcoming image frame, and wherein the current pupil size is determined based on the incident luminance value of the current image frame and one or more previous image frames;
   determine a difference between the current pupil size and the target pupil size; and
   generate an output image by including in the source image metadata indicative of an expected change in pupil size between the current image frame and the upcoming image frame, wherein said metadata indicative of an expected change in pupil size is determined as a function of the difference between the current pupil size and the target pupil size.

2. The video delivery system according to claim 1, wherein the determining the ambient luminance value includes at least one of receiving the ambient luminance value from one or more ambient light sensors, receiving the ambient luminance value from one or more smart light devices, or determining the ambient luminance value based on a time of day.

3. The video delivery system according to claim 1, wherein determining an incident luminance based on an ambient luminance value and a mean luminance value includes applying a cosine cubed function to the mean luminance value and the ambient luminance value to obtain an average adaptation state.

4. The video delivery system according to claim 3, wherein the current pupil size and the target pupil size are adjusted based on the average adaptation state.

5. The video delivery system according to claim 3, wherein the cosine cubed function is scaled such that the integral of the cosine cubed function over a 45° range is 1.

6. The video delivery system according to claim 1, wherein a luminance adjustment factor is based on an estimated discomfort value, the estimated discomfort value being based on the difference between the current pupil size and the target pupil size.

7. A video delivery system for luminance adjustment based upon a viewer adaptation state, the delivery system comprising:
    a processor to decode a received coded bit stream, the processor configured to:
        receive an input image including a current image frame, and upcoming image frame, and metadata indicative of an expected change in pupil size between the current image frame and the upcoming image frame;
        determine, for the current image frame a first target luminance value and for the upcoming image frame a second target luminance value;
        determine an ambient luminance value based on an ambient luminance;
        determine an incidence luminance value of the current image frame based on the ambient luminance value and the first target luminance value;
        determine an incidence luminance value of the upcoming image frame based on the ambient luminance value and the second target luminance value;
        select a tone mapping curve based on a characteristic of a device configured to provide the image;
        determine, using a model that estimates pupil size as a function of incident luminance, a current pupil size and a target pupil size, wherein the target pupil size is determined based on the incident luminance of the upcoming image frame, and wherein the current pupil size is determined based on the incident luminance of the current image frame and one or more previous image frames;
        determine a difference between the current pupil size and the target pupil size;
        alter the tone mapping curve based on the expected change in pupil size and the difference between the current pupil size and the target pupil size; and
        apply the altered tone mapping curve to the input image to generate an output image.

8. The video delivery system according to claim 7, wherein the altered tone mapping curve is negative when the difference between the current pupil size and the target pupil size is negative, and wherein the altered tone mapping curve is positive when the difference between the current pupil size and the target pupil size is positive.

9. The video delivery system according to claim 7, wherein determining the tone mapping curve includes comparing the first target luminance value of the current image frame to a look-up table to obtain input tone curve parameters.

10. The video delivery system according to claim 9, wherein determining the tone mapping curve includes determining an intersection between the first target luminance value of the current image frame and the input tone curve parameters.

11. The video delivery system according to claim 7, wherein the processor is further configured to receive a minimum and a maximum of the altered tone mapping curve by a user input.

12. The video delivery system according to claim 7, wherein the determining the ambient luminance value includes at least one of receiving the ambient luminance value from one or more ambient light sensors, receiving the ambient luminance value from one or more smart light devices, or determining the ambient luminance value based on a time of day.

13. The video delivery system according to claim 7, wherein determining a difference between a current pupil size and a target pupil size further includes adjusting a sampling rate upon detection of a fast-forward event being initiated.

14. The video delivery system according to claim 7, wherein a maximum and a minimum of the tone mapping curve is adjusted based on a user preference setting.

15. A method for luminance adjustment based upon a viewer adaptation state, the method comprising:
    receiving a source image including a current image frame including metadata corresponding to a mean luminance value of the current image frame, and the source image including an upcoming image frame including metadata corresponding to a mean luminance value of the upcoming image frame;
    determining an ambient luminance value based on an ambient luminance;
    determining an incidence luminance value of the current image frame based on the ambient luminance value and the mean luminance value of the current image frame;
    determining an incidence luminance value of the upcoming image frame based on the ambient luminance value and the mean luminance value of the upcoming image frame;
    determining, using a model that estimates pupil size as a function of incident luminance, a current pupil size and a target pupil size, wherein the target pupil size is determined based on the incident luminance value of the upcoming image frame, and wherein the current pupil size is determined based on the incident luminance value of the current image frame and one or more previous image frames;
    determining a difference between the current pupil size and the target pupil size; and
    generating an output image by including in the source image metadata indicative of an expected change in pupil size between the current image frame and the upcoming image frame, wherein said metadata indicative of an expected change in pupil size is determined as a function of the difference between the current pupil size and the target pupil size.

16. A method for luminance adjustment based upon a viewer adaptation state, the method comprising:
    receiving an input image including a current image frame, an upcoming image frame, and metadata indicative of an expected change in pupil size between the current image frame and the upcoming image frame;
    determining, for the current image frame, a first target luminance value and for the upcoming image frame; a second target luminance value;
    determining an ambient luminance value based on an ambient luminance;
    determining for the current image frame an incident luminance of the current image frame based on the ambient luminance value and the first target luminance value;
    determining for the upcoming image frame, an incident luminance value of the upcoming image frame based on the ambient luminance value and the second target luminance value;
    selecting a tone mapping curve based on a characteristic of a device configured to provide the image;
    determining, using a model that estimates pupil size as a function of incident luminance, a current pupil size and a target pupil size, wherein the target pupil size is determined based on the incident luminance of the upcoming image frame, and wherein the current pupil size is determined based on the incident luminance of the current image frame and one or more previous image frames;

altering the tone mapping curve based on the expected change in pupil size and the difference between the current pupil size and the target pupil size; and applying the altered tone mapping curve to the input image to generate an output image.

17. A non-transitory computer-readable medium storing instructions that, when executed by an electronic processor, cause the electronic processor to perform operations comprising the method of claim 15.

* * * * *

UNITED STATES PATENT AND TRADEMARK OFFICE
CERTIFICATE OF CORRECTION

| | | |
|---|---|---|
| PATENT NO. | : 12,293,498 B2 | Page 1 of 1 |
| APPLICATION NO. | : 18/281295 | |
| DATED | : May 6, 2025 | |
| INVENTOR(S) | : Pytlarz et al. | |

It is certified that error appears in the above-identified patent and that said Letters Patent is hereby corrected as shown below:

In the Claims

Column 18, Line 24, in Claim 1, delete "de" and insert --the--

Column 18, Line 27, in Claim 1, delete "mage" and insert --image--

Column 20, Line 49, in Claim 16, delete "frame," and insert --frame--

Column 20, Line 50, in Claim 16, delete "frame;" and insert --frame--

Column 20, Line 58, in Claim 16, delete "frame," and insert --frame--

Signed and Sealed this
Eighth Day of July, 2025

Coke Morgan Stewart
*Acting Director of the United States Patent and Trademark Office*